May 9, 1967  A. M. GARCIA ET AL  3,318,261
CONVEYOR SYSTEMS

Filed April 12, 1965  2 Sheets-Sheet 1

INVENTORS
ANTHONY M. GARCIA
BY LLOYD H. REDFORD

Teare, Fetzer & Teare
ATTORNEYS

INVENTORS
ANTHONY M. GARCIA
BY LLOYD H. REDFORD
ATTORNEYS 3,318,261
CONVEYOR SYSTEMS
Anthony M. Garcia and Lloyd H. Redford, Cleveland,
Ohio, assignors to Earl C. Gibbs, Inc., Cleveland, Ohio,
a corporation of Ohio
Filed Apr. 12, 1965, Ser. No. 447,149
10 Claims. (Cl. 104—91)

ABSTRACT OF THE DISCLOSURE

The present invention comprises a conveyor system for use in slaughtering and skinning animals which includes a double track conveyor which operates with a single track conveyor. The double track conveyor includes a movable angular track section for holding the legs of the animal at different levels and a pivoted feeder track section which is power operated to raise the legs of the animal to the same level for conveyance from the double track conveyor onto the single track conveyor. The invention also includes a mechanical switching mechanism for connecting the tracks of the double track conveyor to the track of the single track conveyor.

This invention relates in general to conveyor systems, and more particularly to a conveyor system especially adapted for use in connection with the slaughtering and skinning of animals.

In the slaughtering of animals for food purposes, the animal, such as a steer, after it is killed, is generally suspended from one of its hind legs on the main rail of a double track conveyor system, and the hide of the animal is removed from the other or non-suspended hind leg. Thereafter, the dressed leg is positioned by means of a trolley in the form of a roller and hook assembly on the partially inclined feeder rail of the conveyor system, and the other hind leg is dressed. Then the last mentioned dressed hind leg is positioned by means of a trolley in the form of a roller and hook assembly back on the main rail, and the carcass proceeds for a short distance being suspended by the two rails. The inclination of the inclined portion of the feeder rail is adapted to gradually bring the associated leg up to the same position as the leg on the main rail, and at a predetermined location the main and feeder rails merge into a single rail system, so that the carcass is then suspended from the single rail with the hind legs in spread fashion for further dressing of the carcass.

Because of the stresses applied to the stationary off-set double track system during the movement of the animal therealong and movement onto the single rail system, it being understood that the animals being processed are of generally many different sizes and weights, such arrangement of conveyor system tends to fail in service and has not been found to be completely satisfactory. Moreover, such stationary arrangement interferes with the efficient dressing of the animals' legs and increases the time and effort spent by the operators in the skinning operation.

The present invention provides a novel double track conveyor system which includes a movable generally angular track section operative to effectively and efficiently support the carcass and raise the suspended legs thereof to the same level during transfer of the carcass from the double track system to the single track system, without the problems heretofore experienced with the prior art stationary arrangements.

Accordingly, an object of the invention is to provide a novel conveyor system.

A further object of the invention is to provide a novel double track conveyor system which includes a movable track member for effectively and efficiently raising a suspended load, such as a carcass of a slaughtered animal, to the same level for transferring the carcass from the double track system to a single track system.

A further object of the invention is to provide a novel conveyor system for use in the slaughtering and skinning of animals which includes a double track conveyor system which merges with a single track conveyor system, operative to transfer the animals suspended from their hind legs from the double track system to the single track system in an efficient and expeditious manner, and wherein the double track system includes a pivoted generally V-shaped feeder track section which is power operated for enabling a convenient suspension of the animal from the double track system, and which will operate effectively to raise the legs of the animal to the same level for transfer of the carcass of the animal after the skinning operation on the suspended hind legs, to the single track system.

A still further object of the invention is to provide a conveyor system of the latter mentioned type which includes novel mechanical switching mechanism for insuring that there will not be any interference during movement of the leg suspending hook and roller trolley means from the double track system onto the single track system, during transfer of the carcass from the double track to the single track system.

Other objects and advantages of the invention will be apparent from the following description taken in conjunction with the accompanying drawings wherein.

Figure 1:
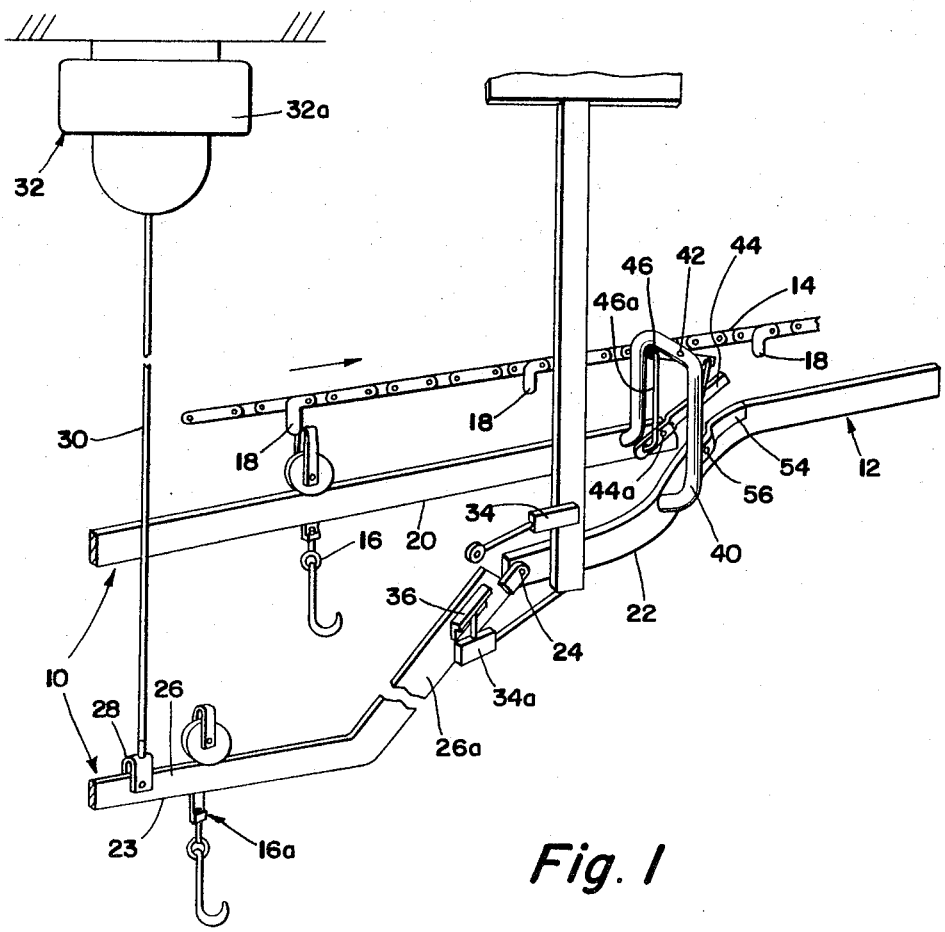
FIG. 1 is a generally diagrammatic, partially broken, perspective view of the double track conveyor system and illustrating its mergence with the single track system, and showing the pivoted angular track section of the feeder portion of the double track system in lowered position, and the coupled power means for pivoting such angular track section in a generally vertical plane.
Figure 2:
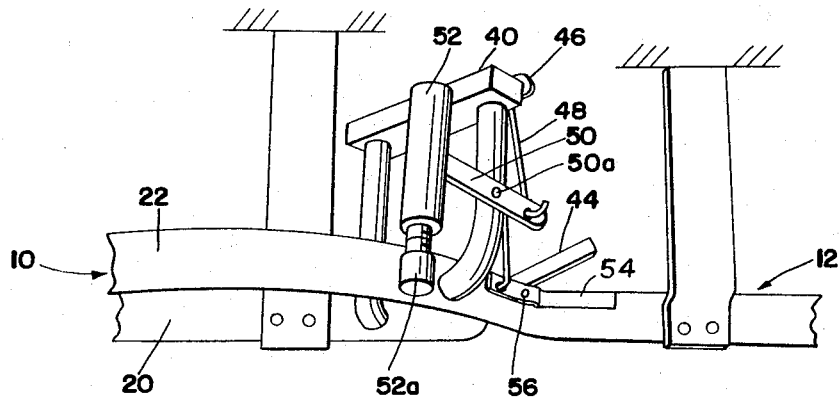
FIG. 2 is a generally diagrammatic, fragmentary side elevational view illustrating the mechanical switching mechanism which facilitates transfer of the roller and hook trolley means on each of the tracks of the double track system onto the single track conveyor system.
Figure 3:
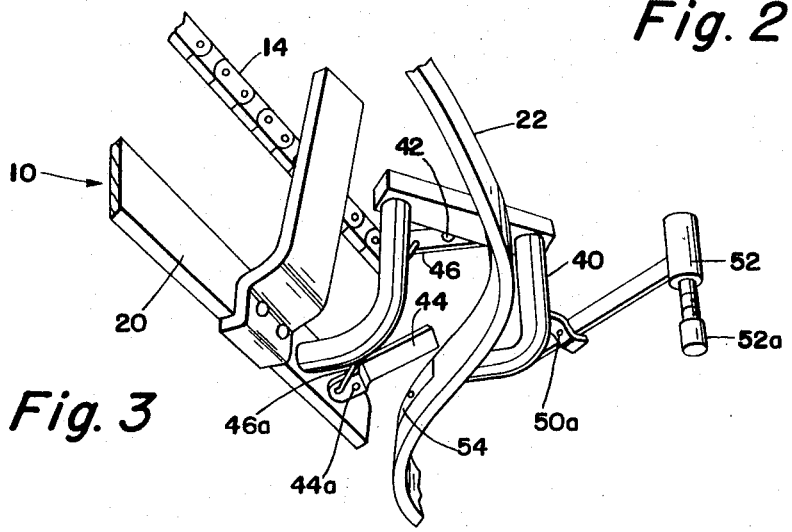
FIG. 3 is a fragmentary perspective view of the FIG. 2 switching mechanism taken at an angle from beneath such mechanism.

Referring now again to the drawings, the transfer conveyor mechanism may comprise a double track system 10 which merges into a single track system 12. A lengthwise movable powered means, which in the embodiment illustrated includes a conveyor chain 14, is provided for moving animal carcasses which are adapted to be suspended by their hind legs in the conventional manner, from the roller and hook trolley assemblies 16, 16a, for movement along the conveyor system, and from the double track system to the single track system. While no animal carcass has been illustrated in FIG. 1, it will be understood that each of the hind legs of such carcass would ordinarily be suspended from a respective one of the roller and hook assemblies 16, 16a, and such legs would be in dressed condition as aforediscussed, ready for movement from the double track system to the single track system.

The aforementioned movable conveyor chain 14 may have lug means 18 thereon, adapted for engagement in the conventional manner with the roller and hook trolley assembly 16 on the main track 20 of the double track system, for moving the trolley 16 there along with movement of the chain, and thus pulling the carcass and the other trolley 16a mounted on the feeder track 22 of the double track system, along such track.

In accordance with the invention, there is provided angular rail section 23 pivoted as at 24 to the remainder of the feeder track 22, and with such pivoted section 23 being of generally V-shaped configuration in side elevation, and when in the lowered position shown in FIG. 1, having the arm portion 26 thereof disposed substantially parallel with the track 20, but in downwardly spaced relationship thereto. Track section 23 may be coupled as by means of bracket 28 and flexible member 30, such as for instance link chain, to a powered winch mechanism 32. Upon actuation of the motor 32a of the winch, which may be an electric motor, the rail section 23 will be pivoted from the position shown in FIG. 1 upwardly until arm portion 26a of the track section 23 is aligned with the forwardly disposed remainder of the track 22. In order to automatically stop the motorized winch mechanism 32 upon actuation thereof, there may be provided limit switch means 34, 34a of conventional type electrically coupled into the circuit of the motor of the winch, and a cam 36 on the track section 23, adapted for actuating engagement with the limit switch means, to automatically stop the motorized winch 32 at the desired upper and lower pivoted positions of the track section 23.

Mechanical switching mechanism may be provided adjacent the juncture of the double track system with the single track system, for enabling the roller and hook mechanisms 16, 16a on the double track system to conveniently transfer to the single track system 12. Such switching mechanism may include a yoke 40 extending between the tracks 22 and 20, and having linkage means 41 pivoted thereto as at 42.

Track 20 may have a track segment 44 pivoted thereto as at 44a, and which track segment 44 is normally disposed in the raised position illustrated. This raised position is accomplished by means of the aforementioned linkage means 41, which may include lever 46 pivoted at 42 to yoke 40, and having link 46a extending between lever 46 and track segment 44 and being movably coupled thereto. The other end of lever 46 is connected by movable link 48 to counterweight arm 50 pivoted as at 50a to yoke 40, and having counterweight 52 supported by arm 50. The weight of the counterweight 52 may be varied by changing the threaded portion 52a thereof.

Figure 4:
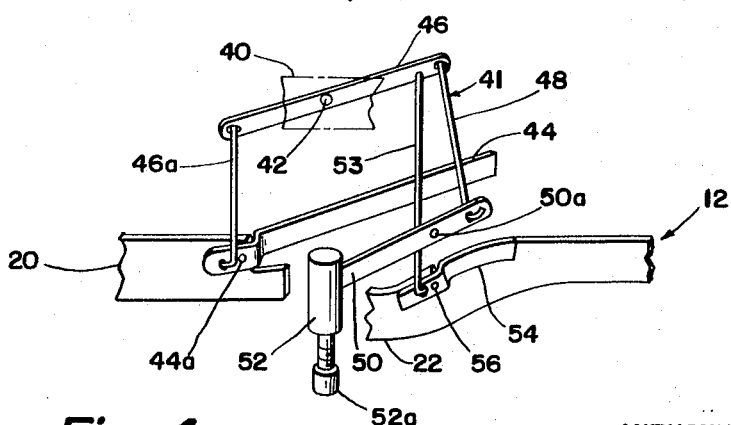
FIG. 4 is a diagrammatic showing of the linkage connections of the switching mechanism of FIGS. 2 and 3, with the generally inverted U-shaped yoke member supporting such linkage having been eliminated in the interest of clarity.

It will be seen, therefore, that the counterweight 52 causes the lever 46 to be pivoted counterclockwise (with reference to FIG. 4) about its pivot 42 on the yoke 40, and therefore pivots the track segment 44 to an elevated position. Also there is provided a link 53 movably extending between lever 46 and track segment 54 pivoted as at 56 to the curved feeder section 22 of the double track system. Thus such counterweight 52 also normally maintains the track segment 54 in down position. As trolley 16 and the supported carcass is moved along the track 20, such trolley will engage the upwardly pivoted track segment 44 and move it downwardly, and at the same time due to the resultant pivoting of lever 46 about its pivot 42, the track segment 54 will be caused to pivot upwardly about its pivotal axis 56. Trolley 16 and its suspended load therefore may pass from track 20 of the double track system onto the single track system 12, while the trolley 16a supporting the other leg of the carcass is prevented from passing onto such single track system by the upwardly pivoted track segment 54.

The operation in order to accomplish the dressing of the animals may be as aforedescribed that one of the hind legs of the slaughtered animal is suspended from track 20 as for instance by a chain, and the hide is removed from the other non-suspended leg, and thereafter such dressed leg is positioned by means of for instance the roller and hook assembly 16a, on arm portion 26 of the pivoted track section 23, which is in its downward pivoted position as illustrated in FIG. 1. Thereafter the other leg is dressed and hooked onto the track 20 by means of the roller and hook assembly 16. One of the lugs 18 on the moving conveyor chain will then engage the trolley 16 and will move it forwardly in the direction of the arrow in FIG. 1, thereby pulling the animal carcass along together with the roller and hook trolley 16a.

The operator may then actuate the winch mechanism whereupon the flexible member 30 will be reeved onto the winch, thereby pivoting the track section 23 upwardly as the trolleys 16, 16a are moved in the direction of the arrow by the conveyor 14, thus moving the carcass along the double track section and raising the trolley 16a to the level of the trolley 16. When arm portion 26a of track section 23 is pivoted into alignment with the forwardly disposed remainder of feeder track 22, limit switch 34 will automatically deenergize the winch. When trolley 16 arrives at the upwardly pivoted track segment 44, the weight causes segment 44 to be pivoted downwardly, thus causing upward pivoting of the track segment 54 about its pivot 56. After trolley 16 moves past the track segment 44 onto the single track section 12, the counterweight 52 automatically causes the track segment 44 to pivot back upwardly and causes the track segment 54 to pivot downwardly, whereupon the trolley 16a can move onto the single track section 12.

While the limit switch means 34, 34a has been shown mounted on the double track system, it will be understood that such limit switch means could be physically incorporated into the powered winch mechanism 32 to accomplish the function of automatically positioning the track section 23 in its desired position with respect to the track 20 and the forwardly disposed remainder of track 22.

The terms and expressions which have been used are used as terms of description and not of limitation, and there is no intention in the use of such terms and expressions of excluding any equivalents of any of the features shown and described, or portions thereof, and it is recognized that various modifications are possible within the scope of the invention claimed.

We claim:
1. In a transfer conveyor mechanism comprising, a double track system, said double track system including a pair of generally laterally disposed tracks each being adapted to support movable trolley means thereon, one of said tracks including a generally angular shaped section pivotable in a generally vertical plane with respect to the other of said tracks, means for moving said section in said generally vertical plane, a single track system disposed adjacent said double track system, and mechanical switching means for connecting the tracks of said double track system to the track of said single track system.

2. A transfer conveyor mechanism in accordance with claim 1 wherein said pivotable section is of generally V-shaped configuration in side elevation and wherein said means for moving said section in said generally vertical plane includes power means operably coupled to said section for selectively pivoting said section in said generally vertical plane.

3. A transfer conveyor mechanism in accordance with claim 2 including limit switch means operably coupled to said power means for deenergizing said power means upon predetermined pivoting of said section in said generally vertical plane.

4. A transfer conveyor mechanism in accordance with claim 3 including means on said track section adapted for actuating engagement with said limit switch means to deenergize said power means after predetermined pivoting of said track section.

5. A transfer conveyor mechanism in accordance with claim 1 wherein said mechanical switching means comprises, a track segment pivoted to each of said rails of said double track system at the juncture of the latter with said single track system, each of said track segments being adapted for movement from a position wherein it couples the respective track of the double track system to the track of the single track system to a position wherein it is pivoted out of coupling engagement with the track of the single track system, one of said track segments being adapted to be in said coupled position when the other of said track segments is pivoted out of said coupled position, and counterweight means operably coupled to said track segments and operative to normally maintain said one track segment in said coupled position and maintain said other track segment pivoted out of said coupled position, said other track segment being adapted for engagement by the associated trolley means to cause pivoting of said other track segment into coupled position and pivoting of said one track segment out of coupled position, against the resistance of said counterweight means.

6. A transfer conveyor mechanism in accordance with claim 5 including linkage means operatively connecting said track segments to said counterweight means, said linkage means including a lever pivoted to a support and links movably coupling said lever to said track segments and to said counterweight means.

7. In a transfer conveyor mechanism comprising, a double track system, and a single track system disposed adjacent said double track system and forming a continuation thereof, said double track system including a pair of generally laterally spaced tracks each being adapted to support movable trolley means thereon, said trolley means being adapted to support a slaughtered animal thereon by the hind legs thereof, one of said tracks including a pivotable section of generally V-shaped configuration in side elevation, pivoted for movement in a generally vertical plane from a lowered position to a raised position and vice versa, power means for pivoting said V-shaped section in said generally vertical plane, means for automatically deenergizing said power means after predetermined pivoting of said V-shaped section, and mechanical switching means for connecting the tracks of said double track system to the track of said single track system.

8. A transfer conveyor mechanism in accordance with claim 7 wherein each of said tracks of said double track system includes a pivotable track segment operative when in downward pivoted position to couple the respective track of the double track system to the track of the single track system, and means for causing one of said track segments to be pivoted upwardly out of coupling position when the other of said track segments is disposed in said coupling position.

9. A transfer conveyor mechanism in accordance with claim 8 including means coupled to said track segments to urge one of said track segments out of said coupling position while urging the other of said track segments into said coupling position.

10. A transfer conveyor mechanism in accordance with claim 9 wherein the last mentioned means comprises a counterweight and linkage means coupling said counterweight to said track segments.

References Cited by the Examiner

UNITED STATES PATENTS 2,401,942    8/1945    Fiel.

FOREIGN PATENTS 336,136    4/1920    Germany.
1,001,879    8/1965    Great Britain.

ARTHUR L. LA POINT, *Primary Examiner.*

J. E. BABER, *Assistant Examiner.*